United States Patent Office 3,544,672
Patented Dec. 1, 1970

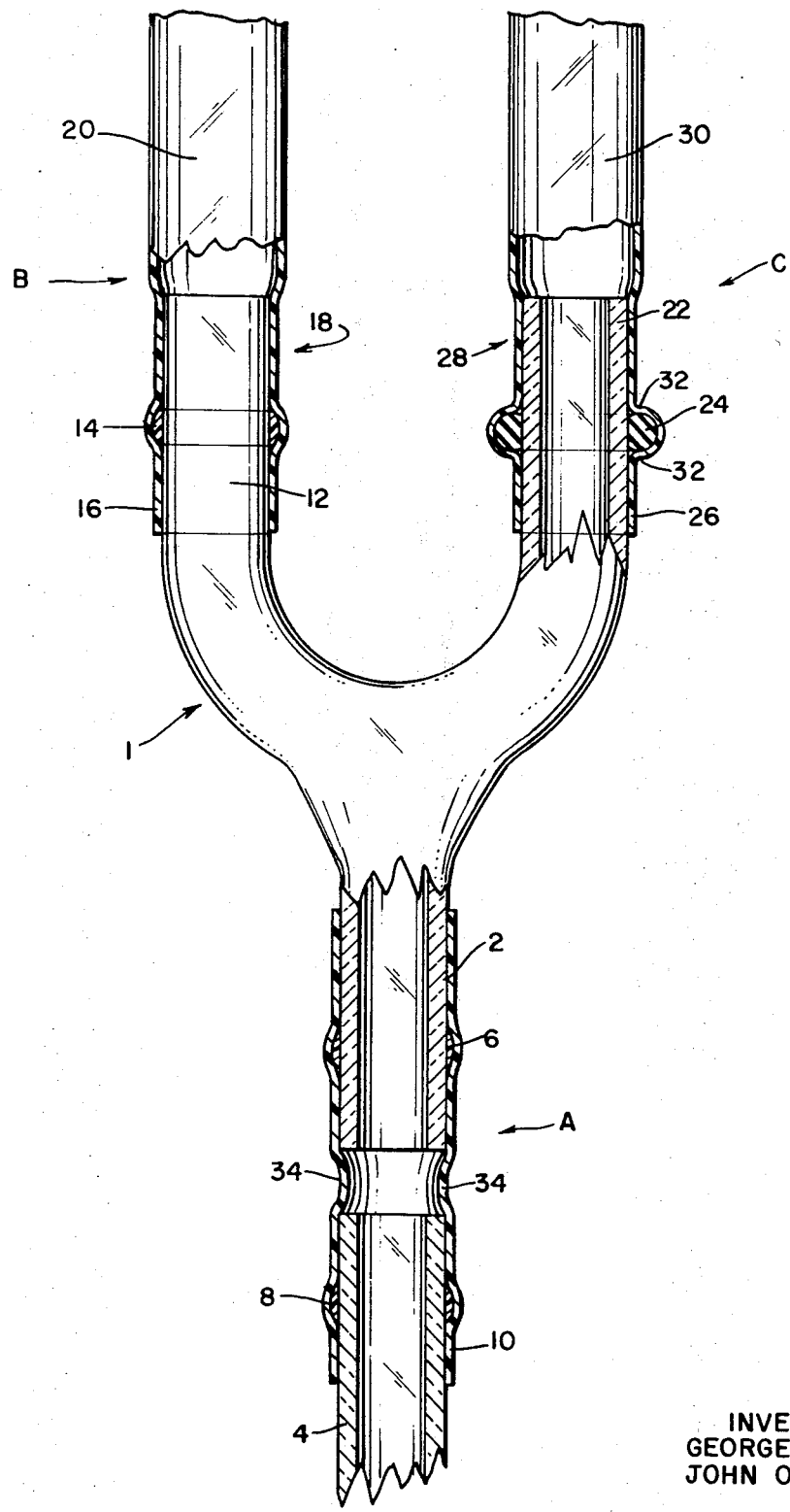

3,544,672
COUPLING AND METHOD FOR MAKING
George Goda, New York, and John O. Fitter, East Northport, N.Y., assignors to Greiner Scientific Corp., New York, N.Y., a corporation of New York
Filed Nov. 6, 1967, Ser. No. 680,810
Int. Cl. B29c 27/00
U.S. Cl. 264—230                                      3 Claims

ABSTRACT OF THE DISCLOSURE

A coupling for elongated members, such as rods or pipes, is provided which can be prepared by inserting the member into a sealing ring which will cover a smaller portion of the member, and a part of a shrinkable sleeve which will cover a larger portion of the member, then shrinking the sleeve over and into intimate engagement with the larger portion of the member and with the ring thereon. The resulting seal is vacuumtight and strong. The other part of the sleeve can be left unshrunk to accept a part of another attenuated member for later sealing, or the other member can be sealed for coupling both members together at the same time. The sealing rings of which more than one can also be applied for each member, can be of a thermoplast, or a shrinkable thermoplast in which case they are required to have only a very small resiliency. These materials will slightly flow during the shrinking of the sleeve by heat. The rings can also be of a rubber which will not flow, but will have a greater resiliency for creation of a good seal. The shrinkable sleeve can be optionally tooled against the base of a rubber sealing ring where it adjoins the surface of a member.

---

The present invention relates to a coupling for elongated objects and a method for carrying it out.

A large variety of devices are available for the coupling of elongated objects, such as of tubing, rods, ducts and the like. The means by which the coupling can be carried out depends on the nature of the coupled objects and the purposes for which the coupling is to be made. Some couplings have to be vacuumtight, other have to withstand high internal pressure. There are flexible couplings, couplings which effect the joinder of fragile objects in a gentle manner lest the object is broken; there are couplings with which the objects can be quickly joined and then dismantled again, and so on. A coupling often has to fulfill more than one requirement at the same time with the result that more often than not, couplings are either complicated in construction with resulting high prices, cumbersome to use, manifest shortcomings in performance, or possess two or all three of these drawbacks. In some applications couplings cannot be successfully used; for example in vapor diffusion pump circuitry it is still the general practice to join tubing by welding rather than by coupling.

The present invention provides a simple, inexpensive easy-to-assemble or to take apart, flexible vacuumtight coupling which will not fracture fragile elongated objects to be joined, and which can be transparent and corrosion-proof, depending on the choice of materials employed.

In accordance with the present invention there is provided in a coupling for joining elongated members such as tubing, rods and the like, (a) resilient annular sealing means, such as a very small length of tubing or an O-ring, for encircling and intimately engaging a smaller part of the outer surface of an elongated member adjacent an end thereof, and (b) shrinkable sleeve means for encircling the parts of the outer surfaces adjacent the opposing ends of elongated members and extending from the opposing ends in substantially inapposite directions, and for intimately overlapping and engaging a larger part of the exterior surface of the elongated member and said annular resilient sealing means on a smaller part thereof.

The present invention, furthermore, provides a method for making the aforesaid coupling, which method comprises inserting at least one elongated member into a resilient annular sealing member and into a portion of a shrinkable sleeve, and shrinking said portion of the shrinkable sleeve over and into intimate engagement with the elongated member and the resilient annular sealing member disposed over a peripheral portion of the elongated member.

The invention is disclosed in greater detail in the following description with reference being had to the sole figure hereof showing various embodiments of the present invention. It is to be understood that even though reference and showing are made in the following description and the figure to glass tubing, transparent shrinkable sleeves, and the like, this is only for purposes of illustration. The essence of the invention, as set forth in the claims, is applicable to a large variety of materials and shapes, e.g., of the elongated members to be joined, the shrinkable sleeve, etc., a fact which should be readily apparent to one conversant with the art.

In the drawing there is shown a Y-connection 1 made of glass, and having three branches respectively designated A, B and C. A different illustrative embodiment of the invention is shown employed in connection with each of these branches.

The end 2 of branch A of the Y-connection 1 is joined with the end 4 of a length of joined glass tubing. An annular sealing member 6 is disposed near the end 2 peripherally about and encircling the tube of branch A, and an annular sealing member 8 is disposed near the end 4 peripherally about the joined tube. The respective ends 2 and 4 of the tubes and the respective annular sealing members 6 and 8 thereon are surrounded by and are in intimate contact with a shrunken sleeve 10.

In the embodiment of the present invention illustrated in connection with branch A, the annular sealing members 6 and 8 are of mechanically expanded polyethylene which has a so-called thermal memory. This material will shrink when heated, tending to recover its original, pre-extension dimensions. During shrinking it will tightly clamp any matter, such as a tube which was inserted therein, provided that the peripheral dimensions of the inserted matter are larger than the ultimate interior peripheral dimensions of the material after it has shrunken to the fullest possible extent. Shrinkable materials of this type are well known and in addition to polyethylene further include other mechanically expanded polyolefins or their halogenated derivatives, swellable plastics which shrink upon the removal of the swelling agent, irradiated polyolefins, variously treated copolymers, and the like. Depending on the nature of the shrinkage mechanism, heating or other like means of causing shrinkage can be employed to bring about the desired result. The employing of opaque or colored sealing members has been found particularly advantageous for denoting their location under the coupling sleeve, for identification of particular materials and of source, as well as to permit a visual control over the quality of the seal. The latter feature can be enhanced by selection of particularly suitable colors.

If one wishes to take advantage of the visual appearance of the sealing member, the shrinkable sleeve 10 has to be transparent, or at least highly translucent. In accordance with the present invention the sleeve is made from a shrinkable polymer having a thermal memory. A particularly suitable transparent polymer for this purpose is a grade of tetrafluoroethylene material sold by E. I. du Pont de Nemours and Company under the trademark Teflon-FEP. The use of transparent materials for the shrinkable sleeve is also advantageous for the reason that it permits visual control of the quality of the seal and the coupling both during its making and throughout its life. The transparency of the shrinkable sleeve also allows the monitoring of material flow and of cleanliness of the joint at all times.

Another embodiment of the invention is shown at branch B where the end 12 of the tube which comprises the branch, is provided with an annular sealing member 14. A shrunken part 16 of a sleeve 18 surrounds the tube ending 12 and the sealing member 14 thereon. A part 20 of the shrinkable sleeve 18 is in its still expanded, unshrunken condition and ready to receive a tube and an annular sealing member (not shown) for later coupling to branch B. Alternatively, the unshrunken part 20 can be already equipped with an annular sealing member (not shown) in which case only a tube, capping and the like, to be joined to branch B has to be inserted into the still expanded unshrunken part.

The embodiments of the present invention described in connection with branches A and B are shown in the drawing with their annular sealing members 6, 8, and 14, being made of a thermoplastic material. In the case of branch A the sealing members are of a thermoplastic material having a thermal memory. It is not necessary that the sealing members be made of a thermoplast, nor is it necessary that they be made of a shrinkable material, however, shrinkability of the material of the sealing member has the advantage of permitting easy and quick placement thereof over and about a member to be coupled, followed by a subsequent shrinking of the sealing member to hold it in its desired place over the member. The use of a thermoplast as the annular sealing member enables a reversible, at least partial melting thereof, preferably in the same step as the shrinking of the sleeve thereover, whereby the pressure exerted by the shrinkable sleeve during its shrinking and a limited extent of flow of a partially molten sealing member cooperate to produce a particularly tenacious and vacuumtight seal.

In a preferred embodiment of the invention the material of the sealing member is shrinkable or unshrinkable polyethylene, and the shrinkable sleeve is from the aforesaid Teflon-FEP. The latter requires about 300° F. for causing it to shrink. Polyethylene softens and melts to some extent at this temperature, so that the shrinking of the sleeve and the partial melting of the sealing member can be accomplished in the same operation. Heat can be furnished during the sealing operation by any convenient means, such as a heated stream of air, even by a match, however, for better control of the sealing operation it can often be advantageous to actually physically contact and manipulate the peripheral surfaces of the shrinkable sleeve with a heated tool or the like. A trough shaped tool, heated as by being attached to the end of a soldering iron, has been found suitable for this purpose.

The annular sealing member can be also of a non thermoplastic resilient material. On the end 22 of the tube of branch C an annular sealing member 24 is provided in the form of a rubber O-ring which would not flow during the shrinking of part 26 of a shrinkable sleeve 28 thereover. Part 30 of the sleeve 28 is still in its expanded condition to receive another tubing portion and sealing member for later sealing and coupling. While cost and/or manipulative advantages might be realized by the use of non-thermoplatsic O-rings or the like sealing member, the use of sealing members made from a thermoplast with or without thermal memory is preferred to provide stronger and more vacuumtight couplings.

The strength and vacuumtightness of a coupling with e.g. a rubber O-ring such as shown on branch C can be further improved by tooling the joining sleeve inwardly snugly against the base of the O-ring during the shrinking of the sleeve as is shown on branch C at 32. This can be suitably accomplished with a heated tool having an edge, such as the aforementioned heated trough shaped tool.

It is an important feature of the coupling of the present invention that the annular means for sealing is of a resilient material. As used throughout the specification and the claims, the term "resilient" is intended to encompass wide range of elasticity. It can be readily seen that in the case of employing materials, such as the sealing members 6 and 8, the attribute of thermoplasticity is relied on to supplement the relatively low elasticity of polyethylene. In the case of using more elastic materials, such as the O-ring 24, the material does not have to have the attribute of thermoplasticity. Consequently, the term "resilient" is used throughout the specification and claims in the sense to denote that when in accordance with the present invention materials having lower elasticity are used for the annular sealing means, these should have the attribute of thermoplasticity.

It is preferred that the portion of the shrinkable sleeve brought into contact with part of an attenuated member, should not be shrunken to its full shrinking capacity. If there is a clearance provided between the opposing ends of the elongated members being joined, after allowance for any longitudinal shrinkage of the sleeve, the finished diameter of the sleeve within the clearance will then be smaller than at its portions which overlap the tube endings as is shown in the drawings in branch A at 34. Depending on the shrinking capacity of the sleeve, its inside diameter in the clearance between the joined tubes can be even less than the inside or even the outside diameters of one or both tubes joined. In this manner a resilient gasket-like separation can be formed between the tubes preventing them from contacting each other. This feature can also add to the flexiblity and resiliency of the entire coupling. Regardless of the remaining shrinking capacity of a sleeve, as used throughout the specification and claims, the term "shrinkable" is intended to refer not only to a sleeve which still has any capacity for potential shrinking, but also to one which has been already shrunken.

In accordance with the present invention coupling can be achieved with simple manipulative steps requiring very short time for completion. The coupling and the method of creating it are particularly useful in the assembly of small-scale laboratory or pilot plant apparatus, instrumentation, and the like. Sufficiently leakproof high vacuum seals can be created with the coupling such as shown in branch A. Such seals have been found to be sufficiently leakproof at high vacuum of $10^{-5}$ mm. Hg. Vacuum-tightness of the coupling can be further enhanced by employing more than one annular sealing member or O-rang on each tube ending to be coupled.

By use of the coupling of the present invention a seal of circumferentially uniform pressure can be created without need to resort to mechanical devices such as clamps. The vacuumtight seal of the invention is prepared under conditions of controlled uniform circumferential pressure without any danger of crushing if the attenuated member is of a fragile material. Since the materials involved in the creation of the coupling are mostly thermoplastic, the joined tubing can be later dismantled by simply heating the coupling, and can often be recreated without need to replace the sleeve, but this is of minor importance in view of the very low cost of the materials that are involved. Alternatively, the coupling can be severed by simple cutting.

We claim:

1. A process for joining elongated members, which comprises inserting a part of at least one of the elongated members to be joined into at least one annular thermoplastic sealing member, at least partially melting said sealing member over and into intimate contact with said part of said elongated member, inserting said part of said elongated member into a part of a shrinkable sleeve, and shrinking said part of said sleeve over and into intimate engagement with said part of the elongated member and the sealing member thereon.

2. A process for joining elongated members, which comprises inserting a part of at least one of the elongated members to be joined into at least one shrinkable annular thermoplastic sealing member, shrinking said sealing member over and into intimate contact with said part of said elongated member, inserting said part of said elongated member into a part of a shrinkable sleeve, and shrinking said part of said sleeve over and into intimate engagement with said part of the elongated member and the sealing member thereon.

3. A process for joining elongated members, which comprises inserting a part of at least one of the elongated members to be joined into at least one shrinkable annular thermoplastic sealing member and into a part of a shrinkable sleeve, and shrinking said sealing member and said part of said shrinkable sleeve over said sealing member both over said port of the elongated member.

References Cited

UNITED STATES PATENTS

| | | | |
|---|---|---|---|
| 3,139,468 | 6/1964 | Wheat | 285—381 |
| 3,423,518 | 1/1969 | Weagant | 285—381 |
| 3,368,830 | 2/1968 | French | 285—123 |

FOREIGN PATENTS

| | | |
|---|---|---|
| 652,054 | 4/1951 | Great Britain 285 (Mem. Plastic Digest) |
| 535,806 | 11/1955 | Italy 285 (Mem. Plastic Digest) |

DAVID J. WILLIAMOWSKY, Primary Examiner

W. L. SHEDD, Assistant Examiner

U.S. Cl. X.R.

264—249; 285—369, 381, 423